United States Patent [19]
Bec

[11] Patent Number: 5,432,773
[45] Date of Patent: Jul. 11, 1995

[54] OPTICALLY-READABLE DATA MEDIUM AND READING DEVICE FOR SUCH A MEDIUM

[75] Inventor: Daniel Bec, Villeneuve Tolosane, France

[73] Assignee: Art Tech Gigadisc "ATG", Toulouse, France

[21] Appl. No.: 880,649

[22] Filed: May 6, 1992

[30] Foreign Application Priority Data

May 14, 1991 [FR] France .................. 91 05810

[51] Int. Cl.$^6$ ............................................ G11B 7/00
[52] U.S. Cl. ............................ 369/275.3; 369/44.26
[58] Field of Search ............ 369/275.3, 275.4, 275.1, 369/275.2, 44.26, 59

[56] References Cited

U.S. PATENT DOCUMENTS

| | | | |
|---|---|---|---|
| Re. 32,937 | 5/1989 | Silvy et al. | 369/275.3 |
| 4,587,648 | 5/1986 | Ando | 369/275.3 |
| 4,748,609 | 5/1988 | Yonezawa et al. | 369/275.3 |
| 4,967,403 | 10/1990 | Ogawa et al. | 369/275.3 |
| 5,099,467 | 3/1992 | Sunihiro et al. | 369/275.3 |
| 5,182,682 | 1/1993 | Weispfenning et al. | 360/77.08 |

FOREIGN PATENT DOCUMENTS

| | | |
|---|---|---|
| 0339672 | 11/1989 | European Pat. Off. |
| 0368585 | 5/1990 | European Pat. Off. |
| 61-26944 | 2/1986 | Japan |

OTHER PUBLICATIONS

"Sectored Servo Headers for Optical Storage Devices", IBM Tech. Disclosure Bulletin, vol. 31, No. 10, Mar. 1989 p. 256.

*Primary Examiner*—Paul M. Dzierzynski
*Assistant Examiner*—Kiet T. Nguyen
*Attorney, Agent, or Firm*—Meltzer, Lippe, Goldstein et al.

[57] ABSTRACT

A mobile optically-readable data medium, arranged in the form of a set of tracks having a sampled type format, each track having pre-engraved zones, known as pre-format zones, and zones reserved for user data, access to said tracks being obtained using pre-engraved marks, known as access marks, representing on each track at least one part of the address of the latter. This medium has no specific radial tracking marks. A reading device for information engraved on the surface of a medium such as that described above; this device performs the radial tracking using information read from the access marks. The invention applies to digital optical disks.

18 Claims, 4 Drawing Sheets

OPTICALLY-READABLE DATA MEDIUM AND READING DEVICE FOR SUCH A MEDIUM

BACKGROUND OF THE INVENTION

The present invention concerns a mobile data medium containing data in the form of marks on its surface, which are optically readable by laser beam and form a set of tracks, a process for handling an error signal indicating a tracking problem, and also the device for reading the mobile data medium.

The marks on the medium can have different forms. For example, they may be engraved or they may protrude. In the rest of this description, the marks are taken to be engraved and of oblong section.

The dimensions of these marks are chosen to be approximately equal to the wavelength of the laser beam. Therefore the interaction of the reading beam with a mark generates a diffracted wave; the dispersion of the radiation then indicates the information represented by the marks.

In the case of mobile media in the form of disks, which shall be taken as the example for the remainder of the description, the data is recorded along tracks comprising either a single spiral extending from the center to the edge of the disk, or a series of concentric circles. During reading the disk moves, rotating about an axis which is perpendicular to the surface of the disk and passes through its center. The tracking is therefore referred to as radial tracking.

It is known that the data stored on optical disks generally has one of two formats: composite continuous format and sampled format. "Format", refers to the arrangement of prerecorded information on the disk, used subsequently by the user to write and read data.

In the first case, the format information is distributed continuously along the whole length of the track, whereas in the second case it is in the form of successive blocks.

In the case of sampled format, each block comprises a header zone, known as a pre-format zone, followed by a zone reserved for the recording of user data. Each pre-format zone contains all the marks which, when read optically, facilitate the correct operation of the reading/writing device. There are four types of pre-format marks: focussing, radial tracking, access and synchronization.

The focussing marks, which can, moreover, be limited to a non-engraved zone, enable monitoring and correction of the focussing of the laser beam in the zone containing the tracks.

The radial tracking marks make it possible to correct any off-centering of the beam in the radial direction.

The access marks allow access to the track of a given address.

The synchronization marks make it possible to control the clocks ensuring the correct operation of the various reading/writing phases.

If no form of correction were provided, the radial tracking of the track, like the focussing or access, would constantly require almost perfect positioning of the reading head relative to the disk. This can not be achieved with reading devices and disks which are required to be easy to manufacture.

This leads to application of real-time control of the radial tracking. In the case of the sampled format, marks placed at regular intervals make it possible to correct any off-centering of the reading beam due to imperfect relative positions of the reading head and the disk. In the case of the composite continuous format, a continuous or almost continuous groove is used.

The means of radial tracking which then guarantee the processing of the data coming from the tracking marks include, amongst other things, optical sensing of the tracking deviation from the groove, and a device for displacing the reading beam, which is activated to compensate these deviations.

For example, the method known as "push-pull" can be described, which consists of using two photosensitive cells each sensing a fraction of the radial tracking beam.

The two cells are mounted on each side of the optical axis of the beam, and the electrical signals produced by these two cells are transmitted to the inputs of a differential amplifier. When the spot of the reading beam is centered on the track, the output signal of the amplifier is null. When the beam is off-center, the output signal of the amplifier represents the direction and amplitude of the off-centering.

The output signal of the differential amplifier is, in every case, transmitted to a radial position controller which corrects the off-centering.

If sampled format is adopted, the tracking device includes sampling means provided at the output of the photodetection means in order to sample the photodetected signal during previously chosen time intervals: those during which the reading spot crosses the radial tracking marks.

There are two known methods of improving the quality of this type of radial position control.

The first consists of applying to the laser beam a slight oscillation of constant frequency about the average axis of its path.

The second method consists of periodically placing one or several tracking marks slightly off-center in relation to the average axis of the laser beam path, which is not in this case subject to any oscillation. This second means produces the same effects as the first.

It is easy to understand the disadvantages associated with each of these methods described above:

In the first case an oscillation must be applied to the laser beam; in the second case, during manufacture of the disk, an optical beam deflector system is required to create the off-center marks.

SUMMARY OF THE INVENTION

The invention does not present these disadvantages. The object of the present invention, according to a first one of its characteristics, is a mobile optically-readable data medium, arranged in the form of a set of tracks having a sampled type format, each track presenting pre-engraved zones, known as pre-format zones, and zones reserved for user data, access to said tracks being obtained using pre-engraved marks known as access marks, representing on each track at least one part of the address of the latter, characterized by the fact that it does not have specific radial tracking marks.

This is an advantage not only because it reduces the space occupied by the pre-format marks, but above all because it means that an optical beam deflector system is no longer required for producing the off-center marks.

In order to read such a data medium, there is also provided according to the invention, in the case of the sampled format, a device for reading data engraved on the surface of a mobile medium, optically readable, and arranged to define a set of tracks, the reading head accessing the said tracks by using pre-engraved marks, known as access marks, representing on each track at least one part of the address of the latter, characterized by the fact that the said device performs the radial tracking using the data read from the access marks.

Therefore the device according to the invention is particularly suitable for reading the disks described in French patent n°85 17560 and published under the n°2 597 248.

This patent deals with access to the tracks in the case where they are engraved in a sampled type format.

According to this patent, each track contains the same number of access marks, regularly distributed over the disk and arranged according to certain radial directions, the variation of the access marks from one track to another, being produced according to the Gray binary code.

As a reminder, the table below shows the Gray code pattern when it is defined, for example, for three bits b2, b1, b0:

| b2 | b1 | b0 |
|----|----|----|
| 0  | 0  | 0  |
| 0  | 0  | 1  |
| 0  | 1  | 1  |
| 0  | 1  | 0  |
| 1  | 1  | 0  |
| 1  | 1  | 1  |
| 1  | 0  | 1  |
| 1  | 0  | 0  |

It can be seen in this list that the code changes by one bit at a time from one combination to another.

This is the way in which the access marks develop in a radial direction.

Therefore, on the disk, there are, in certain radial directions, zones located on both sides of the ideal path of the beam, such that the zone adjacent to one side contains marks whereas the zone adjacent to the other side does not.

For radial tracking this configuration is taken advantage of by giving the reading spot and the access marks relative dimensions such that the error signal produced is derived from the non-symmetry detected in the said zones.

This radial tracking process and the corresponding device may be used for reading disks provided with specific radial tracking marks.

The present invention will be described with reference to an embodiment where the access marks are coded using three bits and one access code is defined per block.

It is of course possible to provide a code comprising more than three bits. Similarly, the access codes may be distributed every n blocks, n being an integer greater than one, on the sole condition that the address data occur sufficiently frequently to allow radial tracking to be performed correctly.

BRIEF DESCRIPTION OF THE DRAWINGS

Other characteristics and advantages of the present invention will become apparent on reading the description of the chosen embodiment, with reference to the attached drawings of which.

In all the figures the same references indicate the same parts.

DESCRIPTION OF THE PREFERRED EMBODIMENT

It was mentioned previously that for a mobile medium in the form of a disk, the data is recorded along tracks comprising either a unique spiral extending from the center to the edge of the disk, or a series of concentric circles.

Therefore, a small section of track, of very short length compared with the radius of the disk, can be considered to be a segment of a straight line.

This approximation will always be applied in the rest of this description: track sections with small enough lengths to be approximated to straight line segments will always be represented, the said segments making it possible to define different axes, if necessary.

The present invention is described with reference to pre-engraved marks of oblong section. It is evident for specialists in the field that other types of marks can be used, notably circular marks.

Figure 1:
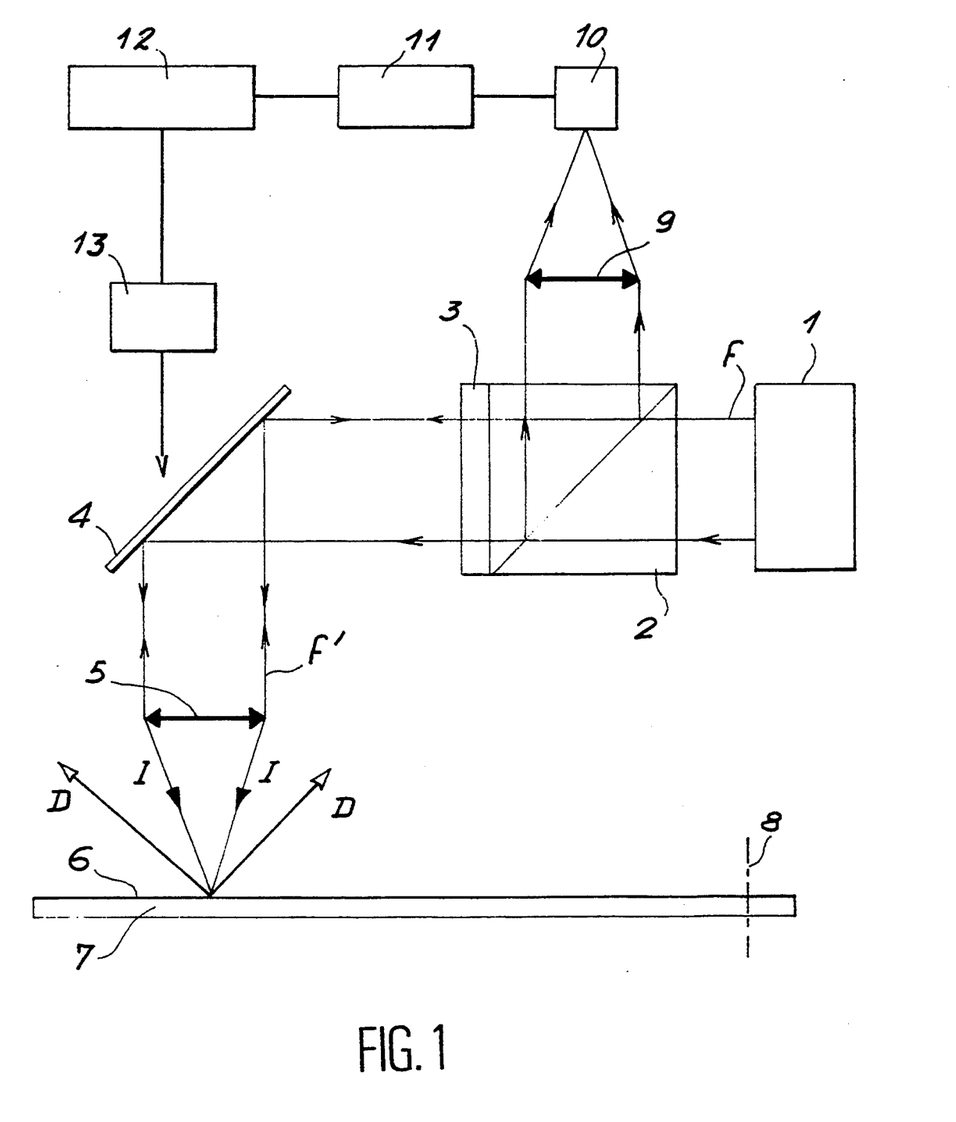
FIG. 1 represents an optical reading device for a pre-engraved data medium according to the present invention.

FIG. 1 describes an example of an optical reading device for a pre-engraved data medium according to the present invention.

A laser module 1 sends a luminous cylindrical beam onto a polarization separator cube 2 followed by a quarter-wave plate 3. The beam f crosses the unit comprising the cube and the quarter-wave plate to arrive at a mirror 4 which reflects the beam f onto a lens 5 whose purpose is to focus the beam on the surface 6 of the mobile medium 7.

The mobile medium 7 rotates about an axis 8. The incident beam which arrives at the mobile medium is denoted as I.I and the beam diffracted by the medium is denoted as D.D.

The fraction of the beam D.D which is found in the lens 5 creates a beam f' which is in turn reflected by the mirror 4.

The beam f' thus reflected passes through the quarter-wave plate 3.

The polarization separator cube 2 then directs the beam f' onto the lens 9 which focuses the said beam onto the photodetector 10 which outputs a signal containing information relating to the off-centering of the reading beam. Using a sampler/blocker device 11, the said signal output from the photodetector facilitates the establishment of the radial error signal. This signal is then sent to a control circuit 12 whose function is to control a motor 13 which corrects the position of the mirror 4 in order to realign the beam.

Figure 2:
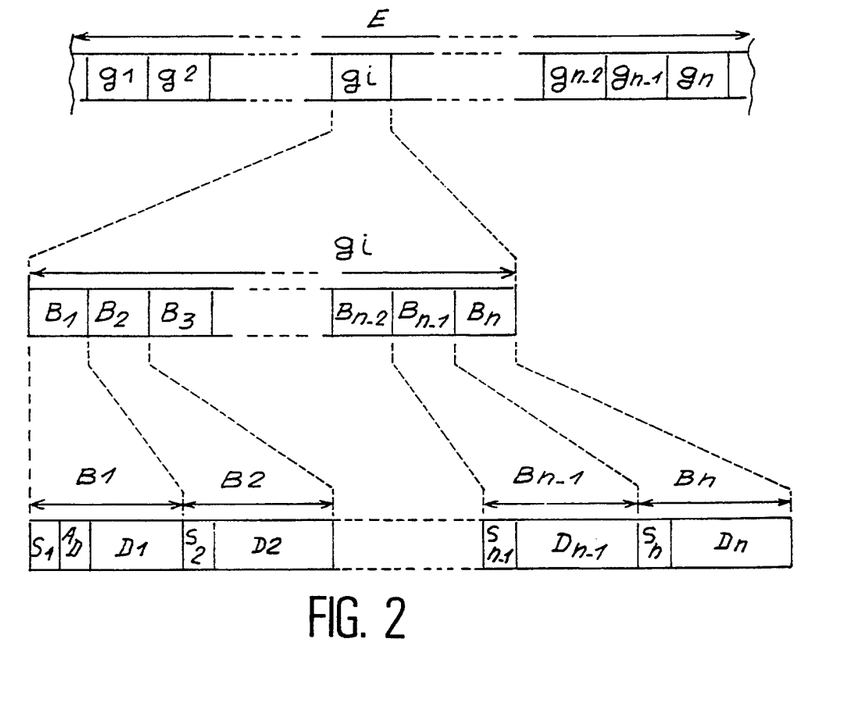
FIG. 2 represents a track section in a sampled type format.

FIG. 2 represents a track section E in a sampled type format. This track section E comprises m sub-sections or granules?? $g_1$ to $g_n$. Each granule comprises n blocks B1 to Bn.

Generally, only the first block B1 contains access marks. The pre-format zone of block B1 then comprises a service zone S1, containing the synchronization and focussing marks, and an address zone AD, containing the access marks.

The pre-format zones of the other blocks Bi (i=2 to n) comprise only service zones Si (i=2 to n).

According to the described embodiment, there is one address zone per subsection (n=1).

Figure 3A:
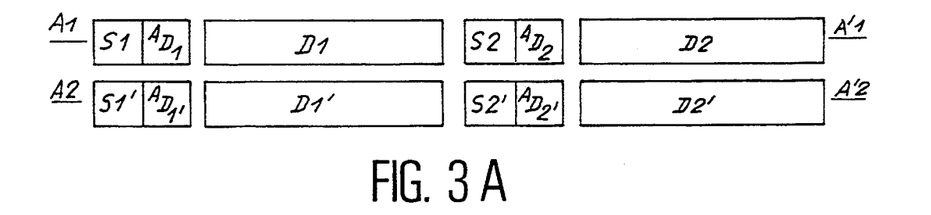
FIGS. 3A and 3B represent the possible relative positions of the pre-format marks and the user data.
Figure 3B:
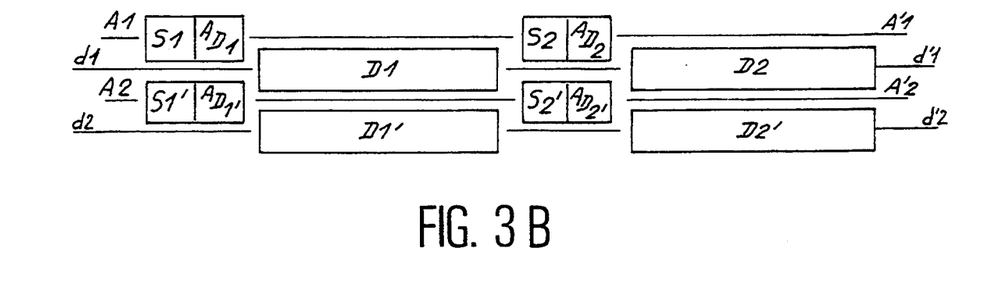

FIGS. 3A and 3B represent the possible relative positions of the pre-format marks and the user data.

The pre-format zones contain the marks whose layout defines an axis. Therefore, according to FIGS. 3A and 3B, the layout of the marks located in the pre-format zones S1, AD1, S2, AD2 of the same line defines the axis A1 A'1.

Similarly, the arrangement of the marks located in the pre-format zones S1',AD1',S2', and AD2' of an adjacent line defines the axis A2 A'2.

The user data can be positioned in two ways in relation to the pre-format marks.

According to the first way (FIG. 3A) the user data are engraved according to the axes defined by the pre-format marks: therefore the data contained in zones D1 and D2 are aligned with the data contained in the pre-format zones S1, AD1, S2, and AD2, and the data contained in zones D1' and D2' are aligned with the data contained in the pre-format zones S1', AD1', S2', and AD2'.

According to the second way (FIG. 3B) the user data are engraved according to a median axis located between the axes defined by the pre-format marks of two adjacent tracks.

Therefore, the data contained in zones D1 and D2 are aligned on an axis d1 d'1 parallel to the two axes A1 A'1 and A2 A'2 and located at an equal distance from these two axes.

Similarly, the data contained in zones D1' and D2' are aligned on an axis d2 d'2 symmetrical to axis d1 d'1 in relation to axis A2 A'2.

Figure 4:
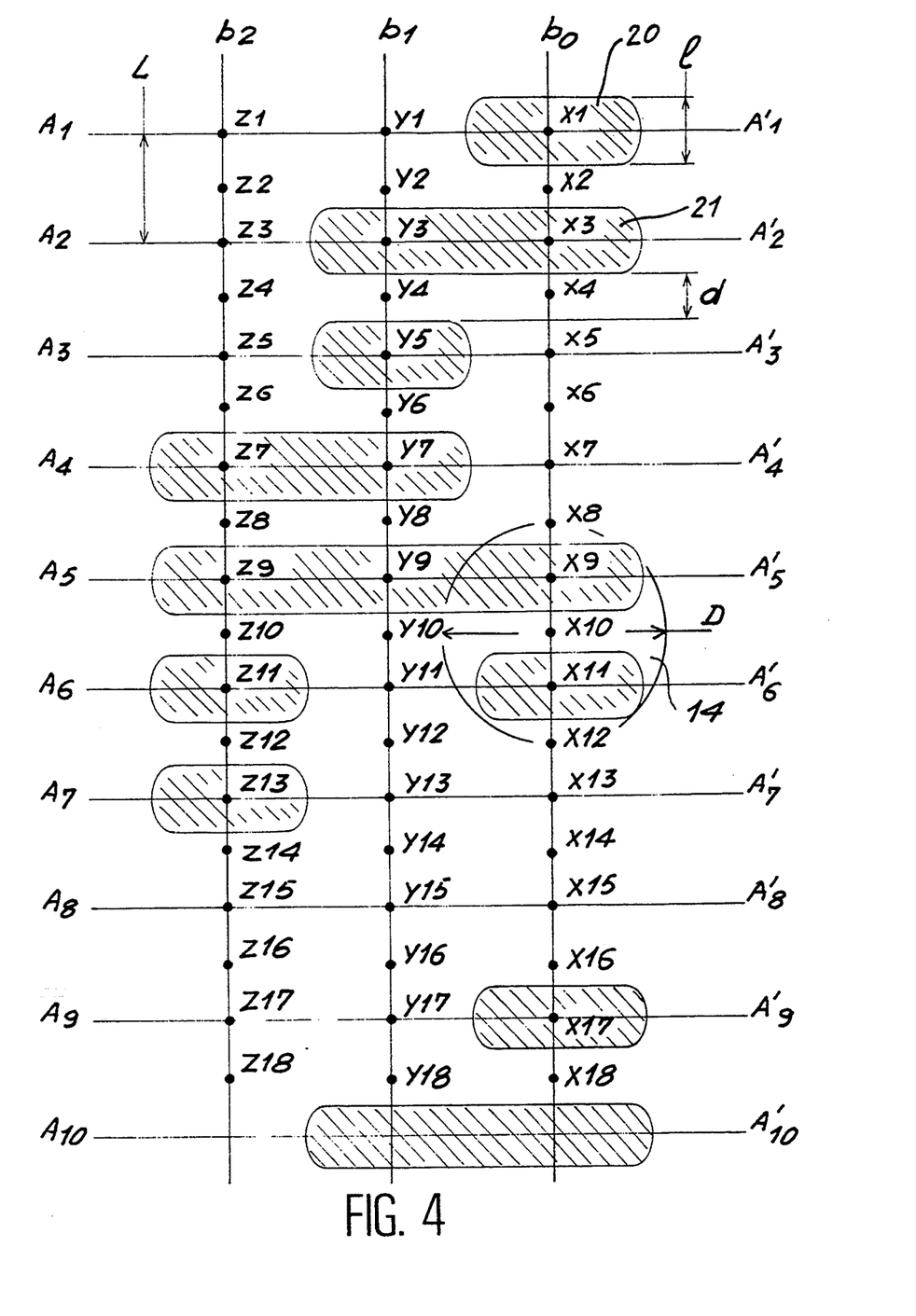
FIG. 4 represents a series of zones containing access marks distributed in a radial direction. According to the chosen embodiment, access is performed on 3 bits in Gray code.

FIG. 4 represents the plan view of a number A of access codes, in this case ten, located on a radial series of A adjacent address zones.

According to the described embodiment, only three bits b2, b1, b0 define the access code for each address zone.

In this figure, the hatched areas 20, 21, etc. represent the pre-engraved marks. The access marks define a series of axes parallel to each other and noted from A1 A'1 to A10 A'10. These axes are separated from each other by the same distance L.

Along axis A1 A'1, the code b2,b1,b0 has a value of 110; along axis A2 A'2, 100; along axis A3 A'3, 101; etc. We see that the access codes are modified by changing a single bit from one pre-format axis to the next.

In the same FIG. 4, the radial progression of each bit is identified by a series of points: X1 to X18 for bit b0, Y1 to Y18 for bit b1, and Z1 to Z18 for bit b2.

Every access mark has a width L and the radial distance which separates two adjacent access marks in the radial direction is d.

The laser beam creates a circular focussing spot 14 on the surface of the disk. The diameter D of this spot is such that it interferes with two adjacent access marks in a radial direction.

Figure 5:
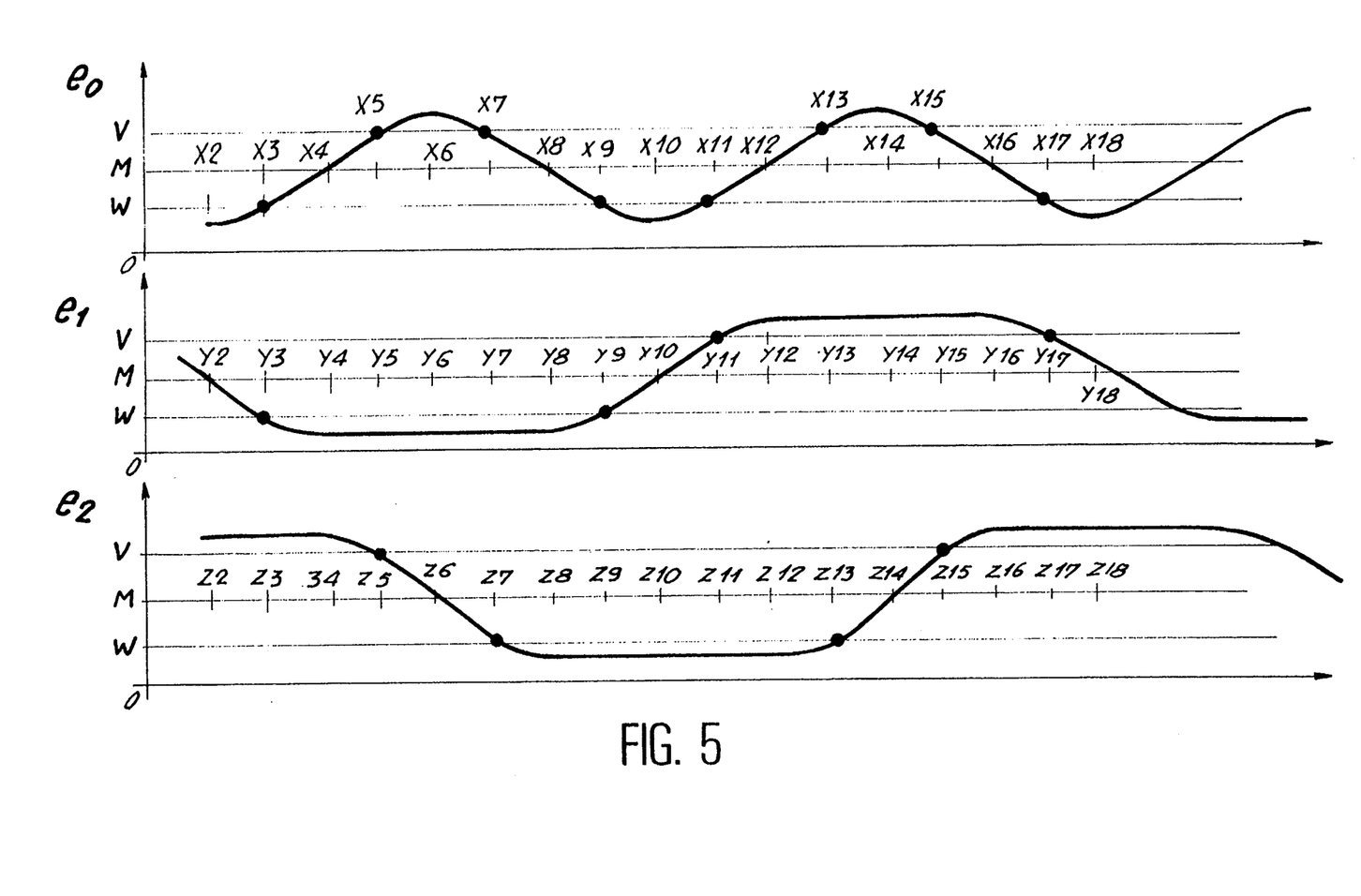
FIG. 5 represents, for each of the 3 bits of the access code in FIG. 4, the detected signal which will be collected on output from the photodetector if the reading beam moves in a radial direction.

FIG. 5 represents, for each of the three bits of the access code, the progression of the detected signal, for example a current, which would be output from the photodetector if the reading beam moved in a radial direction.

The detected signals associated with bits b2, b1, b0 are denoted e2, e1, e0 respectively. On these curves, the radial directions are identified by the set of points Xi, Yi, Zi (i=1 to 18) as in FIG. 4.

Let us suppose that the photodetector moves in the radial direction defined by the Xi set. The progression of Xi's in increasing order of the index i corresponds for example to a radial progression going from the center to the edge of the disk. Taking into account the width L of the access marks, the distance d separating two adjacent access marks and the diameter D of the circular focussing spot 14 of the laser beam, a signal e0 is received, very substantially of sine wave form, as indicated in FIG. 5.

Similarly, if the reading spot progresses in the radial directions defined by the respective sets of points Yi and Zi, the respective detected signals e1 and e2 are received.

For the same reasons as above, the transition zones between maximum and minimum levels of the signals e1 and e2 are substantially of sine wave form.

We notice that curves e0, e1 and e2 all oscillate about an average value M.

It was specified earlier that the user data can be advantageously engraved, either along the axis defined by the pre-format marks (cf FIG. 3A), or along a median axis between the two pre-format axes of two adjacent tracks (cf FIGS. 3B).

Each of these two cases will be described.

In the first case, the user data are engraved and therefore read along the axis defined by the pre-format marks. When the laser beam is correctly positioned, the center of its circular focussing spot passes along one of the axes defined by a triplet of successive points with odd-numbered indices. These points are represented on FIGS. 4 and 5.

In FIG. 5, it can be seen that, in the case studied, two signals combine to define the off-centering of the reading beam. It is these two signals which, taken from the three detected on reading the access code, have a level which can vary depending on the radial off-centering of the beam. For example, following the axis defined by the triplet (X7, Y7, Z7) the useful signals are e0 and e2.

When the beam is correctly centered: e0=V and e2=W.

The error signal is therefore constructed by adding algebraically the respective deviations of e0 in relation to V and of e2 in relation to W.

Therefore, the radial error can be written:

$$e/rad = -(e0-V)-(e2-W)$$

According to the expression above, e/rad is a positive algebraic quantity when the beam moves away from the center of the disk and negative when it moves in the opposite direction.

This sign convention is arbitrary and an opposite sign convention would be just as acceptable. It is evident to specialists in the field that only the sign of the transfer function of the complete control loop is important.

For reasons of symmetry, it is noted that V and W have values such that V+W=2M.

Therefore, another expression of e/rad is:

$$e/rad = -(e0-M)-(e2-M)$$

It is therefore possible to calculate, using the same sign conventions as above, the formulas giving the radial error for all the axes defined by the successive triplets of points with odd indices:

| Triplets Xi, Yi, Zi | e/rad |
| --- | --- |
| X3, Y3, Z3 | +(e0 − M) − (e1 − M) |
| X5, Y5, Z5 | +(e0 − M) − (e2 − M) |
| X7, Y7, Z7 | −(e0 − M) − (e2 − M) |
| X9, Y9, Z9 | −(e0 − M) + (e1 − M) |
| x11, Z11, Y11 | +(e0 − M) + (e1 − M) |
| X13, Y13, Z13 | +(e0 − M) + (e2 − M) |
| X15, Y15, Z15 | −(e0 − M) + (e2 − M) |
| X17, Y17, Z17 | −(e0 − M) − (e1 − M) |

In every case, this error is expressed on the one hand in relation to the only two signals which, taken from among the three signals detected on reading the access code, have a level which varies according to the radial off-centering of the beam, and on the other hand in relation to the average value M. An advantageous way of expressing the radial error is therefore in relation to the average value M.

If we denote by e0, e1 and e2 the signals whose representative curves would be symmetrical to e0, e1 and e2, respectively, in relation to M, then:

$$M = \tfrac{1}{2}(ei+ei) \text{ for each index } (i=0, 1, 2)$$

M can therefore be calculated from a signal ei and the signal ei symmetrical to ei in relation to M.

In fact, an advantageous way of arranging the access codes on a single track is to alternate the polarity of the access codes on two successive blocks.

Therefore, on the same track, a set of blocks referred to as even and a set of blocks referred to as odd are defined.

The code b2, b1, b0 of an even block therefore becomes b2, b1, b0 on the odd block which follows it.

By definition, the bit bi (i=0,1,2) is the one's complement of the bit bi (i=0,1,2).

This modification does not interfere at all with the reading of the addresses as defined in French patent n°2 597 248.

In fact, at all times the even or odd nature of the block which is being read is known. It is therefore sufficient to carry out, in the case of the reading of the access code of an odd block, the one's complement of each of the bits of the access code output from the reading of the signals ei(i=0,1,2) in order to find the correct address.

The value M can be advantageously calculated using a few successive samples of signals ei and ei. Using sampling/blocking devices, this average value is memorized to serve as a reference to create the tracking error signal.

In the case just described, the general radial error formula can therefore be written:

$$e/rad = Sm(em-M) + Sn(en-M)$$

where M is the previously defined average value; em and en are the two signals taken among the three detected on reading the access code of an even or odd block whose level varies depending on the off-centering of the beam; Sm is the relative integer equal to plus or minus one whose value is chosen so that Sm(em−M) is a positive or negative number when the beam moves away from the center of the disk and negative or positive respectively in the opposite case.

The address contained in the Gray code being constantly read, we can choose the two signals em and en from the three available in order to calculate e/rad, allocating the correct values to the parameters Sm and Sn.

In the second case, the user data are engraved and therefore read along an axis parallel to the two pre-format axes of two adjacent tracks and located at an equal distance from each of them.

The laser beam, when it is correctly positioned, is such that the center of the focussing spot travels along one of the axes defined by one of the successive triplets of points having an even index.

In FIG. 5, it can be seen that in this case, a single signal provides the information on the off-centering of the beam.

For example, along the axis defined by the triplet (X4,Y4,Z4) this signal is e0. The signal e0 varying around the average value M, the radial error can be written:

$$e/rad = e0 - M$$

As before, e/rad is therefore an algebraic quantity chosen to be positive when the beam moves away from the center of the disk and negative when the beam moves in the opposite direction. It is again evident here, for specialists in the field, that the opposite sign convention to this is equally acceptable.

Therefore, using the same sign conventions as above it is possible to calculate the formulas giving the radial error for all the axes defined by the successive triplets of points with even indices.

| Triplets (X, Y, Z) | e/rad |
| --- | --- |
| X2, Y2, Z2 | −(e1 − M) |
| X4, Y4, Z4 | +(e0 − M) |
| X6, Y6, Z6 | −(e2 − M) |
| X8, Y8, Z8 | −(e0 − M) |
| x10, Y10, Z10 | +(e1 − M) |
| X12, Y12, Z12 | +(e0 − M) |
| X14, Y14, Z14 | +(e2 − M) |
| X16, Y16, Z16 | −(e0 − M) |

It is again necessary here to determine the average value M.

This is done in the same way as for the previous case. The polarity of the access code changes between two successive blocks of the same track and the value of M is determined using a few samples of successive ei and ei signals then memorized to be used as a reference.

The radial error signal can therefore be written very generally as:

$$e/rad = Sm(em-M)$$

where M is the previously defined average value; en is the only signal among the three detected on reading the access code of an even or odd block whose level varies depending on the off-centering of the reading beam; Sm is a relative integer equal to plus or minus one, whose value is chosen such that the Sm(em−M) is a positive or negative number when the beam moves away from the center of the disk and negative or positive respectively in the opposite case.

The method of description chosen is relative to a Gray code defined for three bits. It is evident for specialists in the field that the general formulas given above and calculated using a Gray code defined for three bits are, in each of the cases studied, the same if the Gray code is defined for N bits, N being an integer greater than three. In fact, the Gray code, whatever the number of bits used, only varies by one bit from one combination to the next.

It has been seen previously that the radial error can be calculated advantageously using the average value M. If this were not the case, it would be necessary to recover the data output from two successive even and odd blocks and combine them to deduce the radial error. The advantage in introducing M is therefore to be able to carry out the radial tracking at the rate that the access codes are read.

Another advantage of having alternate polarities of the access codes located on two successive blocks of the same track is that the reading frequency of the access marks is then equal to half the reading frequency of the synchronization marks. This eliminates the possibility, when initializing of the functioning of the disk, of the reading/writing unit clock latching one of the bits of the access code instead of the configuration of marks used to assure synchronization.

Similarly, according to the invention, it has been seen that specific radial tracking marks are not provided. These marks, when they exist, are read at the same rate as the synchronization marks.

Leaving them out therefore makes it possible to eliminate the same problems as those which can be encountered during the disk initialization phase, with access code marks which do not have reversed polarity.

Therefore, for a mobile data medium defining tracks in sampled format including radial tracking marks in each of the blocks defining the said format, the polarity of successive radial tracking codes are reversed in the same way as the access codes. The synchronization marks are therefore the only ones to be invariant on two successive blocks of the same track.

What is claimed is:

1. Mobile optically-readable data medium, arranged in the form of a plurality of tracks having a sample type format, each track comprising a plurality of sub-sections and a center axis, each sub-section including a plurality of blocks, each block having an engraved pre-formatted zone and a data zone for storing data, wherein the first block of said plurality of blocks contains an address in the form of pre-engraved access marks, wherein the access marks of two addresses of two successive sub-sections of said track are centered on said axis in the absence of specific radial tracking marks which are offset from said axis, and the access marks are coded in a radial direction on said axis of said track, and wherein one bit of said access marks is a complement of a bit having same significance of an adjacent code on an adjacent track.

2. Mobile optically-readable data medium according to claim 1, wherein the access marks are coded according to a Gray binary code comprising N bits, N being an integer greater than or equal to 3.

3. Mobile optically-readable data medium according to claim 1, wherein the data are engraved in the zones along an axis defined by the pre-format marks of the same track.

4. Mobile optically-readable data medium according to claim 3, wherein said mobile optically-readable data medium is in the form of a disk.

5. Mobile optically-readable data medium according to claim 1, wherein the data are engraved in the zones along an axis parallel to two axes defined by the marks contained in the pre-format zones of two adjacent tracks and located the same distance away from each of them.

6. Mobile optically-readable data medium, according to claim 1 wherein the access marks are coded in Gray binary code.

7. Mobile optically-readable data medium according to claim 1, wherein said mobile optically-readable data medium is in the form of a disk.

8. Mobile optically-readable data medium, according to claim 1, wherein said pre-format zone comprises reading beam synchronization marks and said access marks designed to give access to a track of a given address being distributed every n blocks, n being an integer greater than or equal to one, wherein only said synchronization marks are arranged according to an invariant configuration in two successive blocks of the same track.

9. Mobile optically-readable data medium according to claim 8, wherein said pre-format zone is free of specific radial tracking marks.

10. Mobile optically-readable data medium, arranged in the form of a plurality of tracks having a sample type format, each track comprising a plurality of sub-sections and a center axis, each subsection including a plurality of blocks, each block having an engraved preformated zone and a data zone for storing data wherein the first block of said plurality of blocks contains an address in the form of pre-engraved access marks, wherein the access marks of two addresses of two successive sub-sections of said track are centered on said axis in the absence of specific radial tracking marks which are offset from said axis, the access marks are coded in a radial direction on said axis of said track, and the data zones in said two successive sub-sections are on the axis defined by the access marks of the two addresses of the two subsections, and wherein one bit of said access marks is a complement of a bit having same significance of an adjacent code on an adjacent track.

11. Mobile optically-readable data medium according to claim 10, wherein the access marks are coded according to a Gray binary code comprising N bits, N being an integer greater than or equal to 3.

12. Mobile optically-readable data medium according to claim 10, wherein the data are engraved in the zones along an axis defined by the pre-format marks of the same track.

13. Mobile optically-readable data medium according to claim 12, wherein said mobile optically readable data medium is in the form of a disk.

14. Mobile optically-readable data medium according to claim 10, wherein the data are engraved in the zones along an axis parallel to two axes defined by the marks contained in the pre-format zones of two adjacent tracks and located the same distance away from each of them.

15. Mobile optically-readable data medium, according to claim 10, wherein the access marks are coded in Gray binary code.

16. Mobile optically-readable data medium according to claim 10, wherein said mobile optically-readable data medium is in the form of a disk.

17. Mobile optically-readable data medium, according to claim 10, wherein said pre-format zone comprises reading beam synchronization marks, and said access marks designed to give access to a track of a given address being distributed every n blocks, n being an integer greater than or equal to one, wherein only said synchronization marks are arranged according to an invariant configuration in two successive blocks of the same track.

18. Mobile optically-readable data medium according to claim 17, wherein said pre-format zone is free of specific radial tracking marks.

* * * * *